(12) United States Patent
Chu et al.

(10) Patent No.: US 9,894,574 B2
(45) Date of Patent: Feb. 13, 2018

(54) MOBILE RELAY, AND METHOD FOR ENHANCING AND PROCESSING X2 INTERFACE PROXY

(71) Applicant: ZTE CORPORATION, Shenzhen, Guangdong Province (CN)

(72) Inventors: Li Chu, Shenzhen (CN); Yulan Liu, Shenzhen (CN); Yin Gao, Shenzhen (CN); Ying Huang, Shenzhen (CN); Lin Chen, Shenzhen (CN)

(73) Assignee: ZTE Corporation, Shenzhen, Guangdong, Province, P. R. (CN)

( * ) Notice: Subject to any disclaimer, the term of this patent is extended or adjusted under 35 U.S.C. 154(b) by 119 days.

(21) Appl. No.: 14/764,583

(22) PCT Filed: Dec. 31, 2013

(86) PCT No.: PCT/CN2013/091231
§ 371 (c)(1),
(2) Date: Jul. 30, 2015

(87) PCT Pub. No.: WO2014/117627
PCT Pub. Date: Aug. 7, 2014

(65) Prior Publication Data
US 2016/0007256 A1 Jan. 7, 2016

(30) Foreign Application Priority Data
Jan. 31, 2013 (CN) .......................... 2013 1 0038930

(51) Int. Cl.
*H04B 7/14* (2006.01)
*H04J 1/10* (2006.01)
(Continued)

(52) U.S. Cl.
CPC .......... *H04W 36/08* (2013.01); *H04W 84/005* (2013.01); *H04W 84/047* (2013.01);
(Continued)

(58) Field of Classification Search
None
See application file for complete search history.

(56) References Cited

U.S. PATENT DOCUMENTS

2011/0194483 A1* 8/2011 Ji ...................... H04W 36/0033
370/315
2011/0274030 A1* 11/2011 Wang .................... H04W 76/02
370/315
(Continued)

FOREIGN PATENT DOCUMENTS

CN 101998554 A 3/2011
CN 102892155 A 1/2013
(Continued)

OTHER PUBLICATIONS

XP050424608; Discussion on necessity of X2 interface Replay; CATT, CMCC; 3GPP TSG-RAN WG3 Meeting #67 San Francisco, USA, Feb. 22-26, 2010.
(Continued)

*Primary Examiner* — Edan Orgad
*Assistant Examiner* — Rebecca Song
(74) *Attorney, Agent, or Firm* — Ling Wu; Stephen Yang; Ling and Yang Intellectual Property

(57) ABSTRACT

The embodiments of the present document disclose a mobile relay, and a method for enhancing and processing an X2 interface proxy. The method for enhancing an X2 interface proxy comprises: triggering an X2 proxy to relocate from a first node to a second node, or triggering to set up an X2 interface between a third node and the second node; and using the second node as an X2 proxy of the third node and a base station adjacent to the third node.

18 Claims, 16 Drawing Sheets

(51) Int. Cl.
*H04J 3/08* (2006.01)
*H04W 36/08* (2009.01)
*H04W 84/04* (2009.01)
*H04W 92/20* (2009.01)
*H04W 88/04* (2009.01)
*H04W 92/10* (2009.01)
*H04W 84/00* (2009.01)

(52) U.S. Cl.
CPC .......... *H04W 88/04* (2013.01); *H04W 92/10* (2013.01); *H04W 92/20* (2013.01)

(56) References Cited

U.S. PATENT DOCUMENTS

| | | | | |
|---|---|---|---|---|
| 2012/0093125 | A1* | 4/2012 | Hapsari | H04W 36/0016 370/331 |
| 2012/0263096 | A1* | 10/2012 | Masini | H04W 36/10 370/315 |
| 2013/0208649 | A1* | 8/2013 | Waldhauser | H04W 36/0055 370/315 |
| 2014/0135006 | A1* | 5/2014 | Yu | H04W 36/0055 455/436 |

FOREIGN PATENT DOCUMENTS

| | | | |
|---|---|---|---|
| EP | 2953419 | A1 | 9/2015 |
| WO | 2011160924 | A1 | 12/2011 |
| WO | WO2012036613 | A1 | 3/2012 |
| WO | WO2012/134111 | * | 10/2012 |

OTHER PUBLICATIONS

XP050650331; Technical Specification Group Radio Access Network; Mobile Replay for Evolved Universal Terrestrial Radio Access (E-UTRA); LTE-Advanced; 3rd Gerneration Partnership Project; 3GPP TR 36.836 V2.0.1 (Oct. 2012).

* cited by examiner

MOBILE RELAY, AND METHOD FOR ENHANCING AND PROCESSING X2 INTERFACE PROXY

TECHNICAL FIELD

The present document relates to the wireless cellular communication system, in particular to a mobile relay and a method for enhancing and processing an interface (X2) proxy between two nodes in wireless communication system.

BACKGROUND OF THE RELATED ART

To meet the increasing demands of wide-bandwidth and high speed mobile access, the Third Generation Partnership Projects (3GPP) adopts Long-Term Evolution advance (LTE-Advanced) standard.

For the Long-Term Evolution (LTE), the LTE-Advanced retains the core of LTE in its evolution, and on this basis, adopts a series of technologies to expand the frequency and spatial domain, which achieves goals like improving spectrum efficiency, increasing system capacity, etc.

The wireless Relay Technology is one of the LTE-Advanced technologies, which aims at extending cell coverage, reducing dead-ends area in communication, balancing loads, transferring services in a hot-spot area and saving transmit power of a user equipment (UE).

As shown in FIG. 1, a Relay Node (RN) provides functions and services similar to those of a common evolved Node B (eNB) for the UE which accesses to its cell, and also accesses an eNB which services it through a wireless interface in a way similar with that of a common UE.

An eNB that services the RN is referred to as a Donor eNB (DeNB). The DeNB connects with a Mobility Management Entity (MME), wherein a Serving Gateway (S-GW) function and a Packet Data Network Gateway (P-GW) function, as well as a Relay Gateway (GW) function are set in the DeNB, as shown in FIG. 2.

When the RN accesses to the DeNB, the MME will choose the local S-GW and P-GW located in the DeNB for the RN. The S-GW is responsible for transmitting, forwarding, and routing data information between the base station and the P-GW, and providing cache for downlink data packets.

The P-GW is an anchor for a data bearer, which is responsible for forwarding, analysis, lawful interception of the data packet, charging based on the services, and Quality of Service (QoS) control.

The Relay GW which acts as an S1/X2 proxy function, is responsible for processing S1/X2 signallings related to the UE, distinguishing signallings for different UEs, and processing messages correctly. For example, in a fixed relay scenario, an X2 proxy function refers to that there is an X2 interface between the DeNB and the RN1, and there is an X2 interface between the DeNB and neighboring eNB(s) or other RN(s). When the DeNB (Relay GW) has received an X2 message of the RN1, it decides to transfer a related X2 message to which neighboring eNB (s) or RN according to cell information in the X2 message, if the message carries a UE application layer protocol identifier, the DeNB allocates a new UE application layer protocol identifier to the UE, or uses the application layer protocol identifier that has already been allocated to the UE to replace the UE application layer protocol identifier that previously carried in the message, and carries it as the UE application layer identifier allocated by the DeNB in the X2 message sent to other neighboring base stations. When the DeNB (Relay GW) has received an X2 message from other eNB (s) or other RN, it decides whether to send the related X2 message to the RN1 according to the cell information in the X2 message. If the message carries the UE application layer protocol identifier, the DeNB allocates a new UE application layer protocol identifier to the UE, or uses the application layer protocol identifier that has already been allocated to the UE to replace the UE application layer protocol identifier that is previously carried in the message, and carries it as the UE application layer protocol identifier allocated by the DeNB in an X2 message sent to the RN1.

For example, if the received X2 message indicates that the target cell is the RN1, a corresponding X2 message is sent to the RN1.

For example, if the received X2 message is a base station configuration updating message, the base station configuration updating message is sent to the RN accordingly.

By means of the X2 proxy, the information transmission between the RN and other neighboring eNB (s) or RN can be achieved. Wherein, the S1/X2 signal between the RN and the DeNB (Relay GW) is loaded wirelessly by RN, and is transmitted through RN SGW/PGW routing and transferring.

With the large-scale construction and putting into operation of the high speed railway, the demand of communication on the train is increasing. Currently, the practical speed of the high speed railway has reached to 350 km/h. Influenced by Doppler shift, frequent cell handover, large penetration loss of the high-speed rail compartment, coverage of a base station in a related network is difficult to meet the demand of the high-speed rail communication quality. As a result, the industry proposes deploying Relay Nodes on the high-speed rail, which are called mobile relays. As shown in FIG. 1, it is to make the users in a train of the high-speed rail (e.g. UE1 and UE2) directly communicate with a relatively static RN, while the RN can perform handover between different DeNBs in the process of the high-speed rail moving, thereby a large number of users in the compartment are presented from performing handover at the same time, thus ensuring the communication quality between the UE and the RN. In addition, by strengthening the backbone connection between the mobile RN and the DeNB, the above problems existing in the high-speed railway can be well solved.

As for a mobile relay scenario, at present many kinds of structures have been put forward. Among them, Alt2 (without relocation) reuses the structure of the fixed relay, that is, an S-GW function, a P-GW function, and a Relay GW are set in the DeNB. When a Mobile Relay (MR) accesses to an initial DeNB, it can reuse a proxy (X2 proxy) between two nodes to achieve X2 message transmission between the MR and other eNB(s).

During the process of implementing embodiments of the present document, the inventor of the present application finds that in related technologies, when the MR moves with the train and is far away from the initial DeNB, and after handing over to other DeNB, the Relay GW/RN S/PGW of the MR still resides in the initial DeNB. Since the initial DeNB is far away from the current MR, an X2 interface may not exist between the MR and the neighboring eNB(s), so the X2 proxy cannot work between the MR and these eNB(s). At present, the Relay Node and the DeNB only maintain one X2 proxy, there is no method for a plurality of X2 proxies, and no method for maintaining two or more X2 proxies synchronously.

In a Home evolved Node B (HeNB) scenario, when an HeNB exchanges information with a neighboring eNB or an HeNB through an X2 proxy, the above similar problems may occur, which affects the X2 information transmission between the HeNB and other eNB or HeNB. In the HeNB scenario, the X2 proxy can also be called as an X2 GateWay, which has a function similar with that of the X2 proxy in the mobile relay scenario.

SUMMARY

Embodiments of the present document overcome the defects that, under the current situations, an X2 proxy may not work between a Mobile Relay (MR) or a Home evolved Node B (HeNB) and its neighboring base station.

The embodiments of the present document provide a method for enhancing an X2 interface proxy, comprising:

triggering an X2 proxy to relocate from a first node to a second node, or triggering to set up an X2 interface between a third node and the second node, and using the second node as an X2 proxy of the third node and a base station adjacent to the third node.

Optionally, the base station adjacent to the third node comprises an evolved Node B, a Relay Node, a mobile relay, a Pico or a Home evolved Node B (HeNB).

Optionally, triggering an X2 proxy to relocate from a first node to a second node, comprises: during or after handover, triggering the X2 proxy to relocate from the first node to the second node; triggering to set up an X2 interface between a third node and the second node, comprises: during or after handover, triggering to set up the X2 interface between the third node and the second node.

Optionally, using the second node as an X2 proxy of the third node and a base station adjacent to the third node, comprises:

During a process that the X2 proxy relocates from the first node to the second node, triggering and activating the second node as an X2 proxy of the third node and the base station adjacent to the third node; or During or after the handover of the third node, the first node, the second node or the third node triggering and activating the second node as the X2 proxy of the third node and the base station adjacent to the third node.

Optionally, using the second node as an X2 proxy of the third node and a base station adjacent to the third node, comprises:

Carrying an activation indicator in an X2 setup process between the third node or the first node and the second node to use the second node as the X2 proxy of the third node and the base station adjacent to the third node;

Carrying the activation indicator in the X2 handover process or an S1 handover process of the third node from the first node to the second node to use the second node as the X2 proxy of the third node and the base station adjacent to the third node;

Carrying the activation indicator in a base station configuration update message between the third node or the first node and the second node; or After the X2 interface between the third node and the second node is set up, triggering the second node by default as the X2 proxy of the third node and the base station adjacent to the third node.

Optionally, carrying the activation indicator in the X2 handover process or an S1 handover process of the third node from the first node to the second node, comprises:

Carrying the activation indicator in a handover request message sent from the first node to the second node, or carrying the activation indicator in a Radio Resource Control (RRC) connection reconfiguration complete message sent from the third node to the second node.

Optionally, the method comprises:

After activating the X2 proxy function, the second node sending an indicator of Confirmation for X2 proxy Activation to the third node.

The present application provides a method for processing an X2 proxy between two nodes, comprising:

a third node sending an X2 message to at least one X2 proxy node;

an X2 proxy node, which has received the X2 message and has an X2 interface with a target cell, sending the X2 message to the target cell; and the third node receiving a response replied by the X2 proxy node which sends the X2 message to the target cell.

Optionally, a third node sending an X2 message to at least one X2 proxy node, comprises:

the third node carrying a same identifier in various messages sent to at least one X2 proxy node to indicate same information or operation.

Optionally, the method comprises:

according to known information of neighboring cells of a first X2 proxy node and a second X2 proxy node, and information of the target cell to which the X2 message is to be sent, the third node determining to send the X2 message to one of the X2 proxy nodes.

Optionally, the third node determining to send the X2 message to one of the X2 proxy nodes, comprises:

the third node determining to send the X2 message to the X2 proxy node whose neighboring cells include the target cell.

Optionally, the method comprises:

deactivating the X2 proxy function of the X2 proxy node.

Optionally, deactivating the X2 proxy function of the X2 proxy node, comprises:

Carrying a deactivation indicator in an X2 proxy releasing process or an X2 interface releasing process between the third node and the X2 proxy node, to deactivate the X2 proxy function of the X2 proxy node; or When the X2 interface between the third node and the X2 proxy node is released, deactivating the X2 proxy function of the X2 proxy node by default.

Optionally, the method comprises:

the third node receiving a proxy failure response replied by the X2 proxy node which has received the X2 message but cannot perform the X2 proxy.

Optionally, the method comprises:

a plurality of X2 proxy nodes sending the X2 message indicating same information or a same operations to the target cell, and after the target cell has received a first X2 message, the target cell sending a proxy failure response to a sender of the X2 message which has been received repeatedly, and the X2 proxy node, which have received the proxy failure response, sending the proxy failure response to the third node; or One of the X2 proxy nodes which have received the X2 message, sending the X2 message to the target cell, and sending indication information that the X2 proxy has been preformed to other X2 proxy nodes that have received the X2 message and have an X2 interface with the target cell; the X2 proxy nodes, which receive the indication information that the X2 proxy has been performed, sending the proxy failure response to the third node.

Optionally, the method comprises:

after receiving the X2 message, according to the previously known information of the neighboring cell of the second X2 proxy node, the first X2 proxy node determining that the target cell of the X2 message is a neighboring cell of both the first X2 proxy node and the second X2 proxy node;

the first X2 proxy node sending a corresponding X2 message to the target cell, and indicating to the second X2 proxy node that the X2 proxy of the X2 message has been performed; and the second X2 proxy node sending a proxy failure response to the third node after receiving the above X2 message sent by the third node and the indicator that the first X2 proxy node has performed the X2 proxy of the X2 message.

Optionally, a third node sending an X2 message to at least one X2 proxy node, comprises:

The third node sending the X2 message to one of the X2 proxy nodes, when the proxy failure response is received, sending the X2 message to another X2 proxy nodes until the target cell is the neighboring cell of the X2 proxy node that has received the X2 message, and sending the X2 message to the target cell.

Optionally, the proxy failure response carries reason information for the proxy failure.

Optionally, the reason information for the proxy failure comprises that the same information or operation is sent repeatedly, load exceeds a preset threshold, network failure, there is no X2 interface with the target cell; or the target cell is not the neighboring cell.

The embodiments of the present document disclose a mobile relay (MR), comprising:

a triggering module, configured to trigger an X2 proxy to relocate from a first node to a second node, or trigger to set up an X2 interface between the MR and the second node; and an execution module, configured to use the second node as an X2 proxy of the MR and a base station adjacent to the MR.

Optionally, the triggering module is configured to, during or after handover, trigger the X2 proxy to relocate from the first node to the second node, or during or after the handover, trigger to set up an X2 interface between the MR and the second node.

Optionally, the triggering module is configured to trigger and activate during or after the MR handover.

Optionally, the triggering module is configured to carry an activation indicator in an X2 setup process between the MR and the second node to use the second node as an X2 proxy between the MR and base station adjacent to the MR; and carry the activation indicator in an X2 handover process or an S1 handover process of the MR from the first node to the second node to use the second node as an X2 proxy between the MR and the base station adjacent to the MR, carry the activate indicator in a base station configuration update message; or after the X2 interface between the MR and the second node is set up, activate the second node as the X2 proxy of the MR and the base station adjacent to the MR by default.

Optionally, the triggering module is configured to carry the activate indicator in a radio resource control (RRC) connection complete message sent from the MR to the second node.

The embodiments of the present document disclose a mobile relay (MR), comprising:

a sending module, configured to send an X2 message to at least one X2 proxy node; and a receiving module, configured to receive a response replied by an X2 proxy node which sends the X2 message to a target cell.

Optionally, the mobile relay comprises:

a deactivation module, configured to deactivate an X2 proxy function of an X2 proxy node.

Optionally, the deactivation module is configured to carry a deactivation indicator in an X2 proxy releasing process or an X2 interface releasing process between the MR and the X2 proxy node, to deactivate the X2 proxy function of the X2 proxy node; or when the X2 interface between the MR and the X2 proxy node is released, deactivate the X2 proxy function of the X2 proxy node by default.

Optionally, the receiving module is configured to receive a proxy failure response replied by the X2 proxy node which has received the X2 message and has no X2 interface with the target cell.

Optionally, the receiving module is configured to receive the proxy failure response replied by the X2 proxy node.

Wherein the sending module is configured to send the X2 message to a plurality of X2 proxy nodes; the plurality of X2 proxy nodes send the same X2 message to the target cell, and after receiving a first X2 message, the target cell sends the proxy failure response to a sender of the X2 message which has been received repeatedly; or The sending module is configured to send the X2 message to the plurality of X2 proxy nodes; one of the X2 proxy nodes which has received the X2 message sends the X2 message to the target cell, and sends indication information that the X2 proxy has been performed to other X2 proxy nodes that have received the X2 message and have an X2 interface with the target cell; the X2 proxy nodes, which have received the indication information that X2 proxy has been performed, reply the proxy failure response to the MR.

Optionally, the sending module is configured to send the X2 message to an X2 proxy node; when the receiving module receives a proxy failure response that the target cell is not a neighboring cell of the X2 proxy nodes that has received the X2 message, send the X2 message to another X2 proxy node; and the receiving module, is configured to receive the proxy failure response.

Compared with the related technology, the embodiments of the present document enhance the interface proxy function among nodes.

Other characteristics and advantages of the present document will be described in the following description, and part of which will become more apparent from the description. The purpose and other advantages of the present document can be achieved and gained in the description, claims and structures especially noted in the drawings.

BRIEF DESCRIPTION OF DRAWINGS

The accompanying drawings are used to provide understandings of the technical scheme of the embodiments of the present document, which constitute a part of the specification, and also used together with the embodiments of the application to explain the technical scheme of the embodiments of the present document, and are not intended to limit the technical scheme of the embodiments of the present document.

PREFERRED EMBODIMENTS OF THE INVENTION

Figure 1:
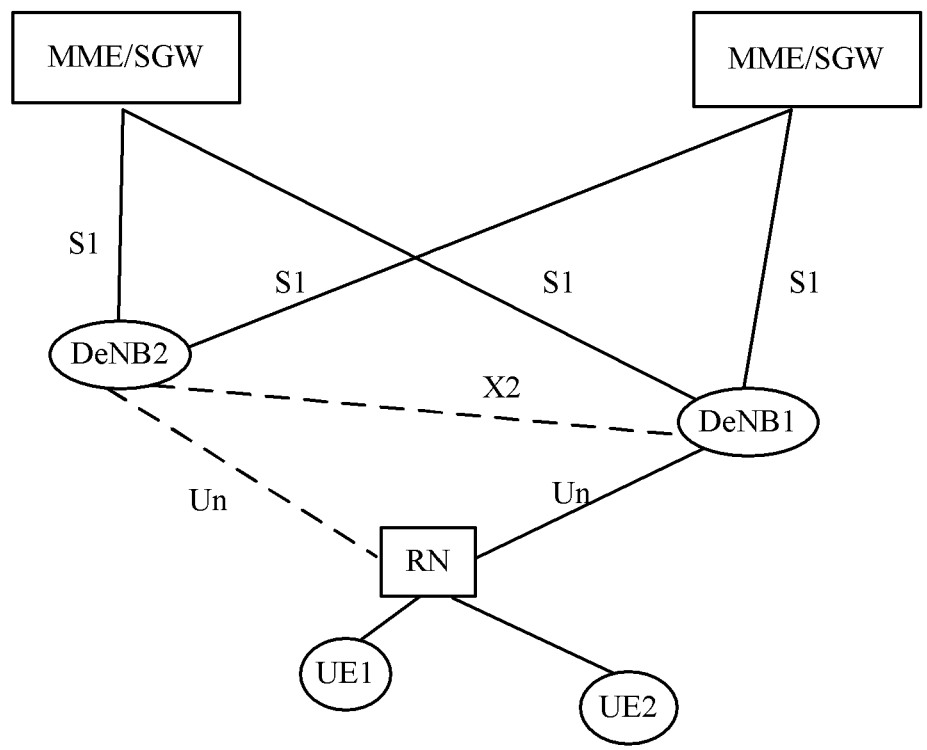
FIG. 1 is a schematic diagram of a mobile relay deployment scenario.
Figure 2:
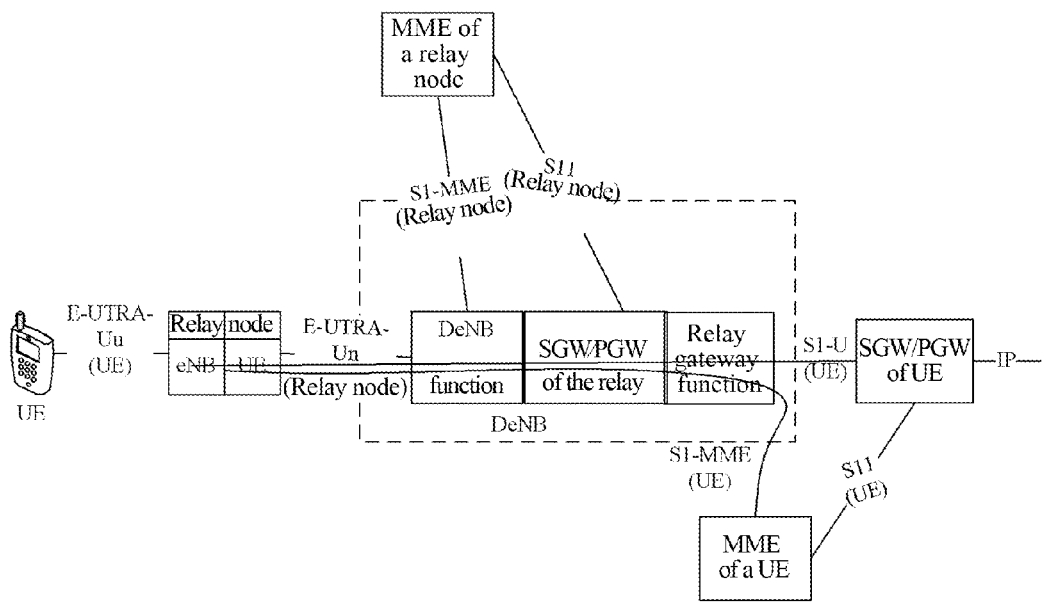
FIG. 2 is a schematic diagram of a structure of a fixed relay.

The embodiments of the present document will be described in details below in conjunction with accompanying drawings, which can help fully to understand and implement the implementation process of how the present document applies technology to solve technical problems and achieve the technical effect. It should be illustrated that without a conflict, the embodiments of the present application and the features in the embodiments can be combined with each other randomly, all of which should fall within the protection scope of the present document.

In addition, the steps shown in the flowchart of the drawings can be executed in a computer system of a set of computer executable instructions. Moreover, although logical orders are shown in the flowchart, in some situations, the steps shown or described in the flowchart can be executed in different orders other than the orders herein.

Since an initial DeNB is far away from a current MR, and if there is no X2 interface between eNBs adjacent to the MR, an X2 proxy cannot work between the MR and these eNBs. It is more possible that an X2 interface exists between the eNBs adjacent to the MR and a Serving DeNB, thus the embodiments of the present document considers to achieve X2 message transmission of the MR and other eNBs adjacent to the MR through the X2 connection between the MR and the Serving DeNB.

In the embodiments of the present application, it is to trigger the X2 proxy to relocate from a first node to a second node, or trigger to set up an X2 interface between a third node and the second node; and to use the second node as an X2 proxy of the third node and a base station adjacent to the third node.

Wherein, for example, the X2 proxy can be a relay gateway, the first node can be an initial DeNB, the second node can be a serving DeNB, and the third node can be a mobile relay (MR). In other embodiments of the present application, the X2 proxy, the first, second and third nodes may also be other network elements.

In the embodiments of the present application, it is to trigger a Relay GW to relocate from the initial DeNB to the serving DeNB, at the same time, an RN S/PGW relocation is performed. And it is to use the serving DeNB as an X2 proxy of the MR and the eNBs adjacent to the MR.

In the embodiments of the present application, it is to trigger to set up an X2 interface between the MR and the serving DeNB directly, which can be triggered during or after the handover, for example, through the RN PGW of the initial DeNB, that is, for the initial DeNB, the X2 interface is invisible. The serving DeNB is used as the X2 proxy function of the MR and the eNBs adjacent to the MR, during or after the MR handover, it can be triggered and activated by the initial DeNB, serving DeNB or MR. The relationships between the MR and two X2 proxies are maintained simultaneously (that is, the MR can maintain a plurality of X2 proxy relationships at the same time). Or preferably, after the X2 proxy function of the serving DeNB is activated, it is to deactivate the X2 proxy function of the initial DeNB. The serving DeNB will serves as an X2 proxy of the MR and the eNBs adjacent to the MR (the serving DeNB needs to identify X2 information related to the UE).

Preferably, the base stations adjacent to the MR include but not limit to many kinds of base stations, such as eNB(s), RN(s), MR(s), Pico(s), and HeNB(s), etc.

According to the second scheme, it can be divided into the following methods:

A Method 1 for activating an X2 proxy, mainly comprises that: it is to carry an activation indicator in an X2 setup process between an MR and a serving DeNB; or in this scenario, once an X2 interface is set up between the MR and the serving DeNB, using the serving DeNB as the X2 proxy function is activated by default. Preferably, the serving DeNB can send an activation confirmation indicator or an activation failure indicator to the MR. It is illustrated that, the activation of an X2 proxy initiated by the initial DeNB and the serving DeNB is similar with the above.

A method for deactivating an X2 proxy, mainly comprises that: it is to carry a deactivation indicator in an X2 proxy releasing process between the MR and the serving DeNB. Or it is to carry a deactivation indicator in an X2 releasing process between the MR and the serving DeNB. Or in this scenario, once the X2 proxy between the MR and the serving DeNB is released, the function of the serving DeNB used as an X2 proxy will be deactivated by default. Preferably, the serving DeNB can send deactivation confirmation indication information or deactivation failure indication information to the MR.

For example, the MR sends an X2 proxy release request message to the initial DeNB, and preferably, the message may carry the deactivation indicator. When receiving the proxy release request message, the initial DeNB relies an X2 proxy release response message to the MR. Preferably, the message can further carry an indicator of Confirmation for X2 proxy deactivation.

A Method 2 for activating an X2 proxy, mainly comprises that: it is to carry an activation indicator in a process of an MR handover from an initial DeNB to a serving DeNB, which can be performed in an X2 handover process, and further can be performed in an S1 handover process. It is to carry the activation indicator in handover request message sent from the initial DeNB to the serving DeNB. Or it is to carry the activation indicator in an RRC connection reconfiguration complete message sent from the MR to the serving DeNB. An X2 connection is set up between the MR and the serving DeNB.

Preferably, after the serving DeNB has received the activation indicator, it can carry an indicator of Confirmation for X2 proxy Activation or an indicator of failure for X2 proxy Activation in a handover request confirmation message sent to the initial DeNB or in an X2 interface setup response message sent to MR.

A Method 3 for activating an X2 proxy, mainly comprises that: it is to carry a deactivation (closing the proxy function) indicator in a base station configuration update message between an MR/initial DeNB and a serving DeNB. And it is to initiate a setup of an X2 interface between the MR and the serving DeNB.

Preferably, the above described activation/deactivation indicator refers to an indication for activating/inactivating an X2 proxy function.

Preferably, the above described activation/deactivation indicator refers to an indicator for activating/deactivating an X2 proxy function of the MR.

In the embodiments of the present application, relationships between the MR and two X2 proxies can be maintained simultaneously (i.e. the MR can maintain a plurality of X2 proxy relationships simultaneously), for example there are following four method in a scenario in which both DeNB1 and DeNB2 are activated as the X2 proxy of the MR.

Method 1: X2 message transmission is controlled by the MR.

The MR determines to send a corresponding X2 message to only one of the DeNBs according to known neighboring cell information of the DeNB1 and DeNB2, and information of a target cell to which an X2 message is to be sent. The neighboring cell of the DeNB comprises the target cell.

The DeNB which has receives the X2 message performs the X2 proxy function and determines to send a corresponding X2 message to the target cell according to the target cell in the message.

The DeNB replies a corresponding X2 response to the MR.

Method 2: the MR sends the X2 message to be sent to two DeNBs respectively, and the two DeNBs do not perform enhanced processing.

The MR sends the X2 message to be sent to two DeNBs respectively.

When receiving the X2 message, the DeNB determines to send the corresponding X2 message to the target cell according to the target cell in the message.

If the target cell does not belong to the neighboring cell of the DeNB, the message will not be sent. Preferably, the DeNB can reply a corresponding failure message to the MR. Preferably, reason information is carried to indicate that the target cell is not a neighboring cell.

When receiving the X2 message sent from the DeNB, the target cell performs corresponding processing on the message and makes a reply.

If the target cell has received the X2 message which indicates same information or a same operation and comes from a DeNB different from that of the previous message, it replies a failure response to the DeNB which sends the current X2 message. Preferably, reason information is carried to indicate that it is repeatedly sent.

The DeNB replies the corresponding response message to the MR after receiving the reply from the target cell.

Method 3: the MR sends the X2 message to be sent to two DeNBs respectively, and the two DeNBs perform enhanced processing.

The MR sends the X2 message to be sent to two DeNBs respectively. Preferably, the MR can carry a same identifier in both messages, which indicates that they are the same message or operation.

After receiving the X2 message, according to the previously known information of the neighboring cell of the DeNB2 which is the X2 proxy of the MR, the DeNB1 determines the target cell of the X2 message is the neighboring cell of both the DeNB1 and the DeNB2. The DeNB1 sends the corresponding X2 message to the target cell, and sends indication information which indicates that the X2 proxy of the message has been performed to the DeNB2. Preferably, the above message identifier can be carried.

After receiving the above X2 message from the DeNB1, the target cell replies to a corresponding response message to the DeNB1.

The DeNB1 replies a corresponding response message to the MR according to the response replied by the target cell. Preferably, the above same message identifier can be carried in the message.

The DeNB2 replies a failure response to the MR after receiving the X2 message sent from the above MR and indication information which indicates that the X2 proxy of the message has been performed sent from the DeNB1. Preferably, the reason information is carried to indicate that it is repeatedly sent. Preferably, the above same message identifier is carried.

Method 4: the MR sends the X2 message to one of the DeNBs.

The MR sends the X2 message to the DeNB1.

After receiving the X2 message, the DeNB1 sends a corresponding X2 message to the target cell according to the target cell in the message.

If the target cell does not belong to a neighboring cell of the DeNB1, the message will not be sent. Preferably, the DeNB1 can reply a corresponding failure message to the MR. Preferably, reason information is carried to indicate that the target cell is not a neighboring cell.

When receiving the X2 message sent from the DeNB1, the target cell performs processing on it accordingly and makes a reply.

The DeNB1 replies a corresponding response message to the MR after receiving the response from the target cell.

If the MR has received a failure response sent from the DeNB1 and the reason information indicates that the target cell is not a neighboring cell, the MR sends the X2 message to the DeNB2. The DeNB2 performs corresponding processing on the X2 message according contents of the message, and replies a corresponding response message to the MR.

In the embodiments of the present application, the reason information carried in the failure response may be, for example, the load exceeding a preset threshold, or a network failure, etc.

Figure 3:
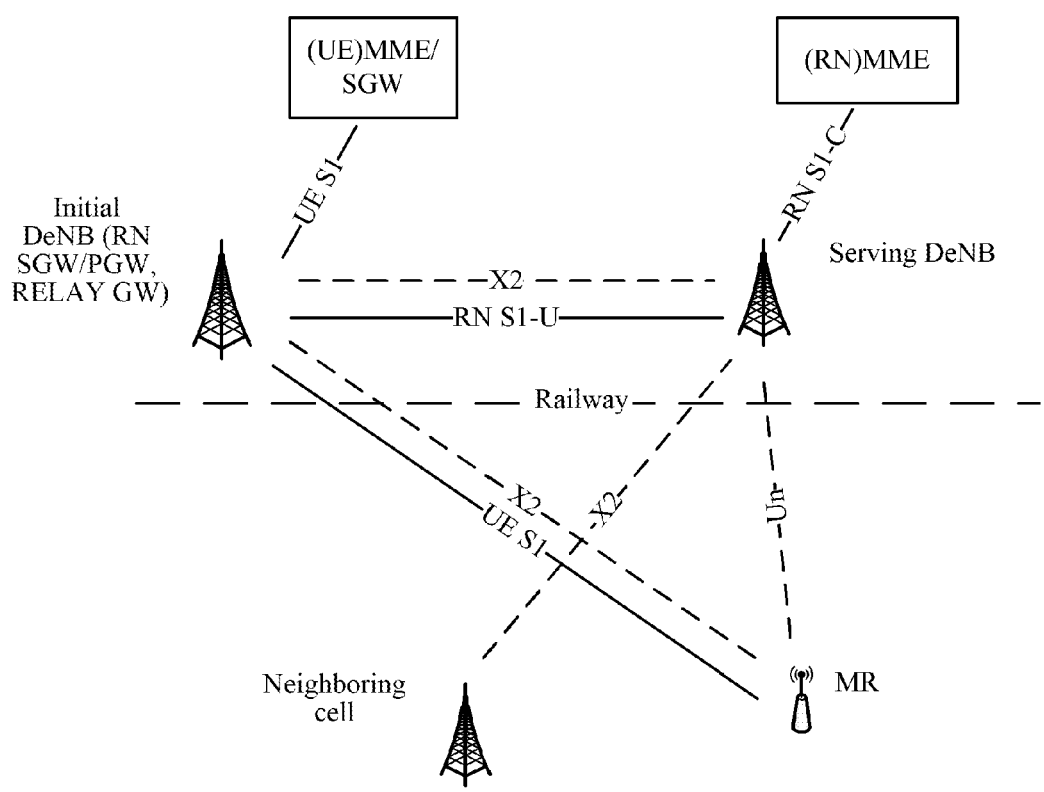
FIG. 3 is a schematic diagram of a first scenario of an X2 interface of a mobile relay in the embodiments of the present application.
Figure 4:
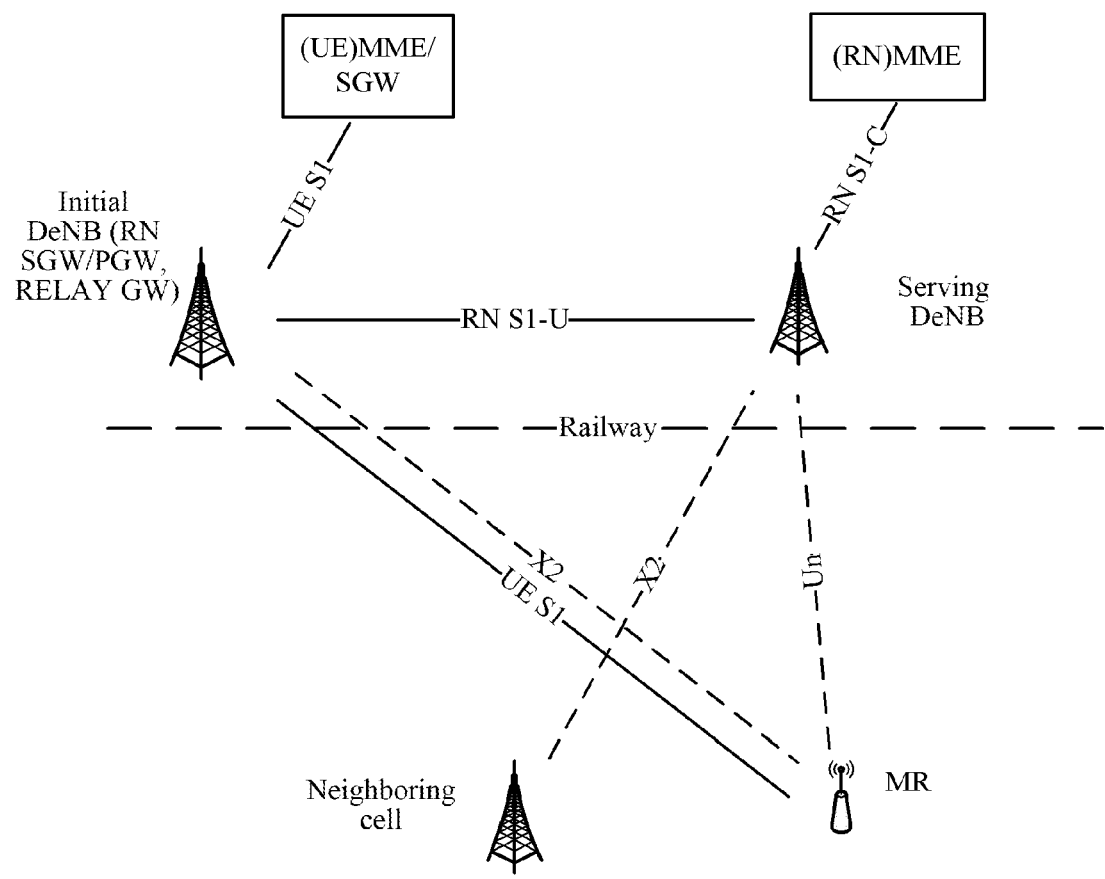
FIG. 4 is a schematic diagram of a second scenario of an X2 interface of a mobile relay in the embodiments of the present application.

It should be illustrated that the embodiments of the present application are not limited to a relay scenario, and can also be applied to an ordinary base station or a home base station scenario or the base station scenarios in other form. The embodiments 1 to 10 are described by taking the MR scenario as an example. In the embodiments of the present application, the specific processing process that can be applied to HeNB scenario is the same with the processes described in the embodiment 1, embodiment 2, embodiments 5 to 10, which will not be repeated here. Wherein, in an HeNB scenario, an HeNB corresponds to an MR in an MR scenario (i.e. the third node), a first X2 proxy corresponds to an Initial DeNB in the MR scenario (i.e. the first node), a second X2 proxy corresponds to a Serving DeNB in the MR scenario (i.e. the second node), and other eNBs or HeNBs correspond to eNBs adjacent to the MR in the MR scenario. As in the scenario shown in FIG. 3, there is no X2 interface between the initial DeNB and the MR Neighbor eNBs, and it does not meet a condition of a direct interface. As in the scenario shown in FIG. 4, there is an X2 interface between the serving DeNB and the eNBs adjacent to the MR.

A direct X2 interface between the MR and the serving DeNB is set up, which can be triggered during or after handover through an RN PGW of the initial DeNB, that is, for the initial DeNB, the X2 interface is not visible.

An X2 proxy function of the serving DeNB as an X2 proxy between the MR and other eNBs or DeNBs is activated, which can be triggered and activated during or after the MR handover through the initial DeNB, serving DeNB, or MR.

Relationships between the MR and two X2 proxies are maintained simultaneously, that is, the MR can maintain a plurality of X2 proxy relationships simultaneously. Or preferably, after the X2 proxy function of the serving DeNB is activated, the X2 proxy function of the initial DeNB is deactivated. The serving DeNB will serve as an X2 proxy of the MR and other eNBs adjacent to the MR, and the serving DeNB needs to identify the X2 information related to the UE.

Embodiment 1

Figure 5:
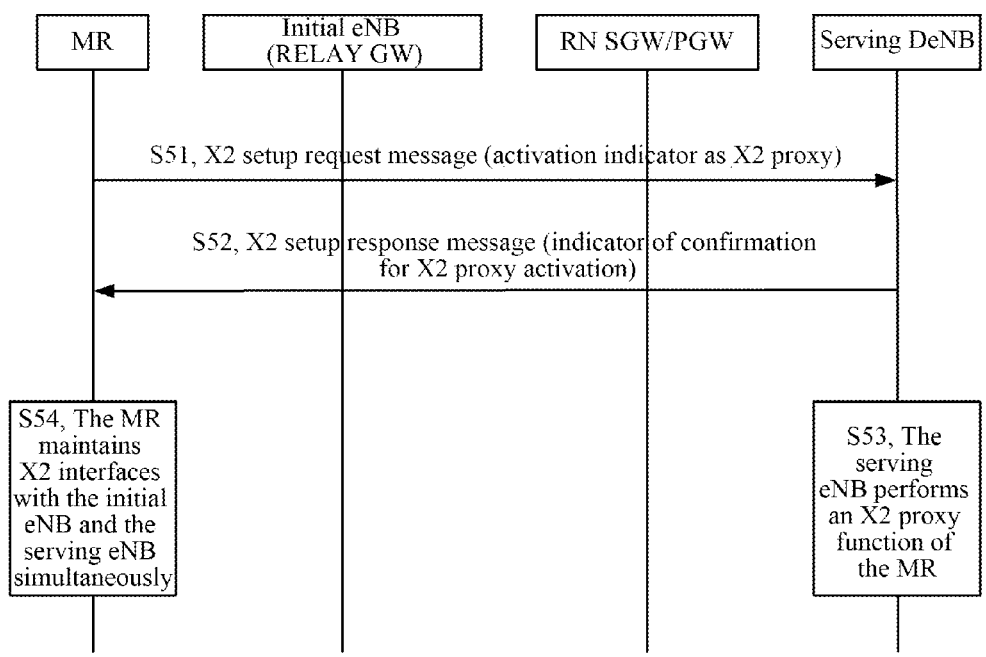
FIG. 5 is a flowchart of a first case of a method for enhancing an X2 interface proxy in embodiments of the present application.

As shown in FIG. 5, in the embodiments of the present application, the embodiment in which an X2 connection setup process initiated by the MR activates an X2 proxy, comprises following steps.

In step S51, an MR sends an X2 SETUP REQUEST message to a Serving DeNB.

In the embodiments of the present application, the X2 SETUP REQUEST message carries an activation indicator as X2 proxy. Preferably, above activation indicator is used as an indicator for the X2 proxy function of the MR.

In step S52, after receiving the X2 SETUP REQUEST message, the Serving DeNB replies an X2 SETUP RESPONSE message to the MR, to confirm that the X2 interface is successfully set up.

In the embodiments of the present application, the X2 SETUP RESPONSE message may carry an indicator of confirmation for X2 proxy activation or an indicator of failure/rejection for X2 proxy activation.

Or, after receiving the X2 SETUP REQUEST message, the Serving DeNB X2 replies an X2 SETUP failure message to the MR to confirm the X2 interface is set up unsuccessfully. In the embodiments of the present application, the X2 SETUP failure message carries the reason for the failure, which indicates that the X2 proxy is not supported.

In the embodiments of the present application, as shown in FIG. 5, if the X2 interface is set up successfully, the Serving DeNB performs the X2 proxy function of the MR (step S53).

In the embodiments of the present application, as shown in FIG. 5, if the X2 interface between the MR and the serving eNB is set up successfully, the MR maintains an X2 between the MR and the Initial eNB and an X2 interface between the MR and the serving eNB simultaneously (step S54). For example, the X2 message is sent to two eNBs simultaneously or only sent to one eNB according to the related information.

Embodiment 2

Figure 6:
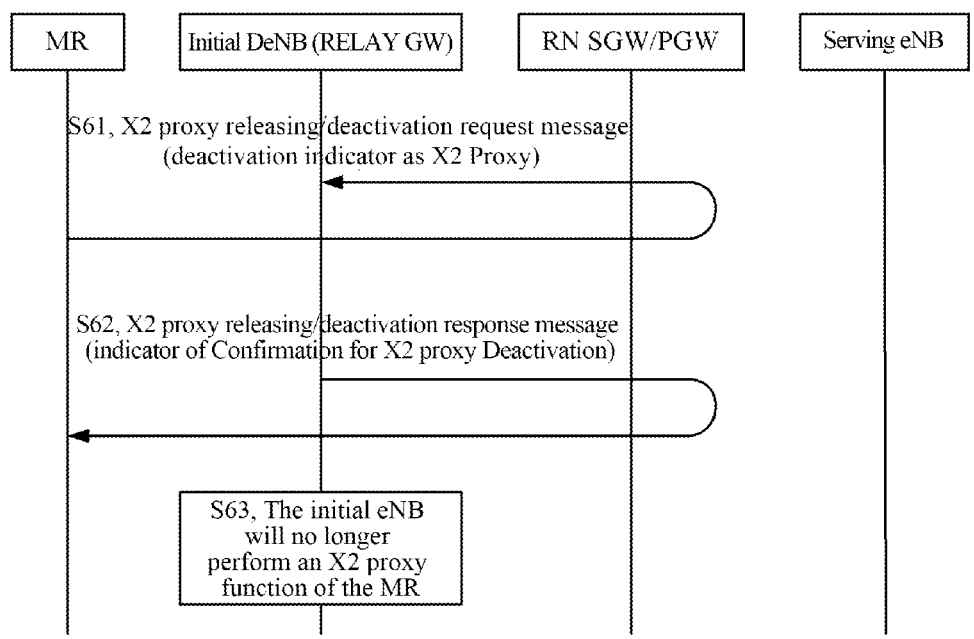
FIG. 6 is a flowchart of a second case of the method for enhancing the X2 interface proxy in embodiments of the present application.

As shown in FIG. 6, in the embodiments of the present application, the embodiment in which the X2 proxy releasing/deactivation is initiated by the MR comprises following steps.

In step S61, an MR sends an X2 proxy releasing/deactivation request to an Initial DeNB (shown in FIG. 5 and FIG. 6 as Initial DeNB, i.e. Ini DeNB).

In the embodiments of the present application, the X2 proxy releasing/deactivation request message may carry a deactivation indicator as X2 proxy. In the embodiments of the present application, the above Deactivation indicator as X2 proxy is an indicator for deactivating the X2 proxy function of the MR.

In step S62, after receiving the X2 proxy releasing/deactivation request message, the Initial DeNB replies an X2 Proxy releasing/deactivation response message to the MR, to confirm that the X2 proxy is successfully deactivated. In the embodiments of the present application, the message can carry an indicator of confirmation for X2 proxy deactivation.

Or, after receiving the X2 proxy releasing/deactivation request message, the Initial DeNB replies the X2 Proxy releasing/deactivation failure message to the MR. In the embodiments of the present application, the X2 proxy releasing/deactivation failure message may carry a reason for the failure.

In the embodiments of the present application, if the X2 proxy is released successfully, the Initial DeNB will no longer perform the X2 proxy function of the MR (step S63).

Embodiment 3

Figure 7:
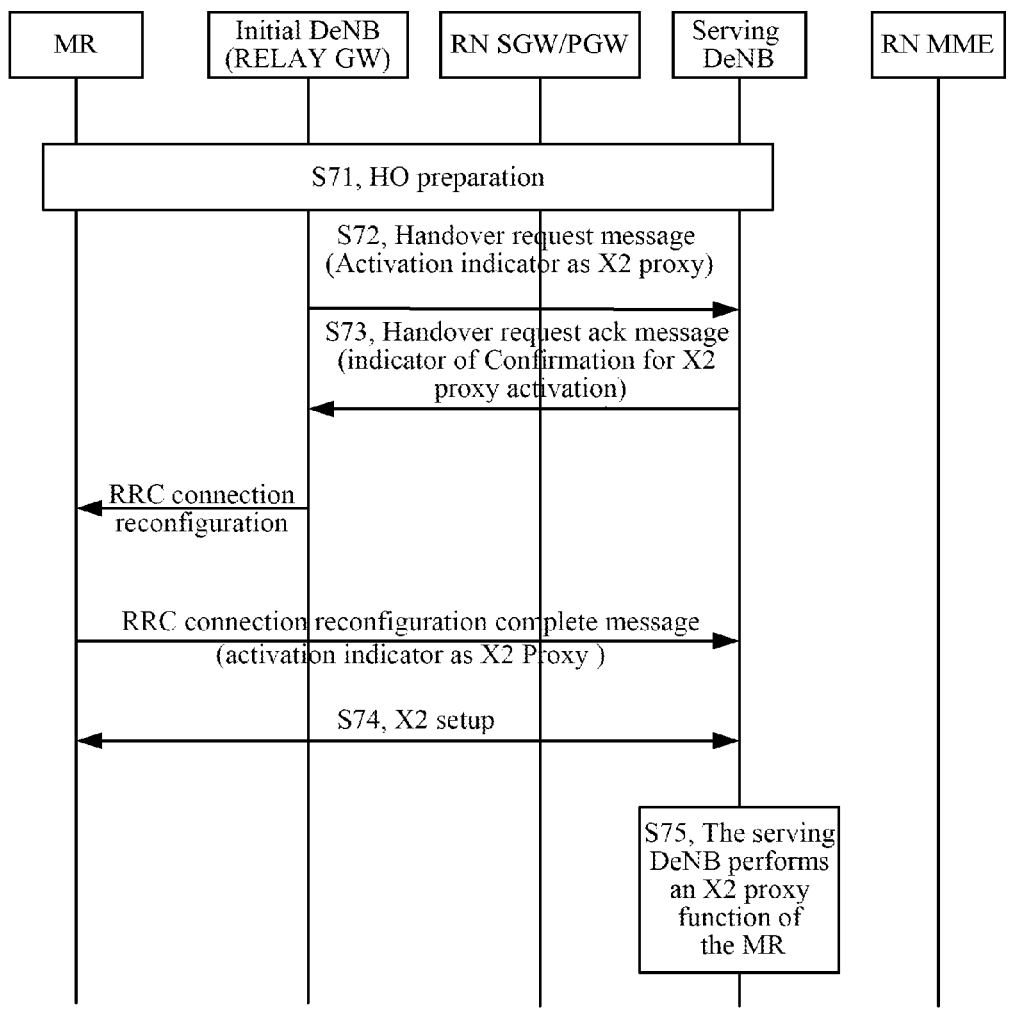
FIG. 7 is a flowchart of a third case of the method for enhancing the X2 interface proxy in embodiments of the present application.

As shown in FIG. 7, in the embodiments of the present application, an X2 handover process activates an X2 proxy, and an activation indicator is carried in the handover process of the MR from an initial DeNB to a serving DeNB (FIG. 7 is the X2 handover process, and it can also be operated in an S1 handover process). An activation indicator is carried in the handover request message sent from the initial DeNB to the serving DeNB. Or an activation indicator is carried in the RRC connection reconfiguration complete message sent from the MR to the serving DeNB. An X2 connection between the MR and the serving DeNB is set up.

Preferably, after receiving the activation indicator, the serving DeNB can carry an activation confirmation indicator in the handover request confirmation message sent to the initial DeNB or in the X2 interface setup response message sent to the MR, comprising following steps:

In step S71, it is a handover Preparation (HO Preparation) process before the handover of the MR from the initial DeNB to the serving DeNB, such as configuring MR measurements, MR measurements reporting, and the initial DeNB performing a handover judgment.

In step S72, the initial DeNB sends an X2 handover request message to the serving DeNB. Preferably, the X2 handover request can carry an activation indicator as X2 proxy. Preferably, above activation indicator is an indicator for activating an X2 proxy function of the MR.

In step S73, after receiving the X2 handover request message, the Serving DeNB replies an X2 handover request Ack message to the initial DeNB. Preferably, the X2 handover request ack message can carry an indicator of confirmation for X2 proxy activation or an indicator of rejection/failure for X2 proxy activation.

Or, after receiving X2 handover request message, the Serving DeNB replies an X2 handover failure message to the MR. Preferably, the X2 handover failure message carries the indicator of rejection for X2 proxy activation.

In step S74, it is to perform the subsequent handover process. Preferably, if the handover is successful and the X2 proxy activation is not rejected, the X2 interface is set up between the MR and the Serving DeNB.

In step S75, the Serving DeNB performs the X2 proxy function of the MR.

Preferably, if an indicator of the X2 proxy activation is not in the above handover request message, it can be carried in the RRC connection reconfiguration complete message sent from the MR to the Serving DeNB.

Embodiment 4

Figure 8:
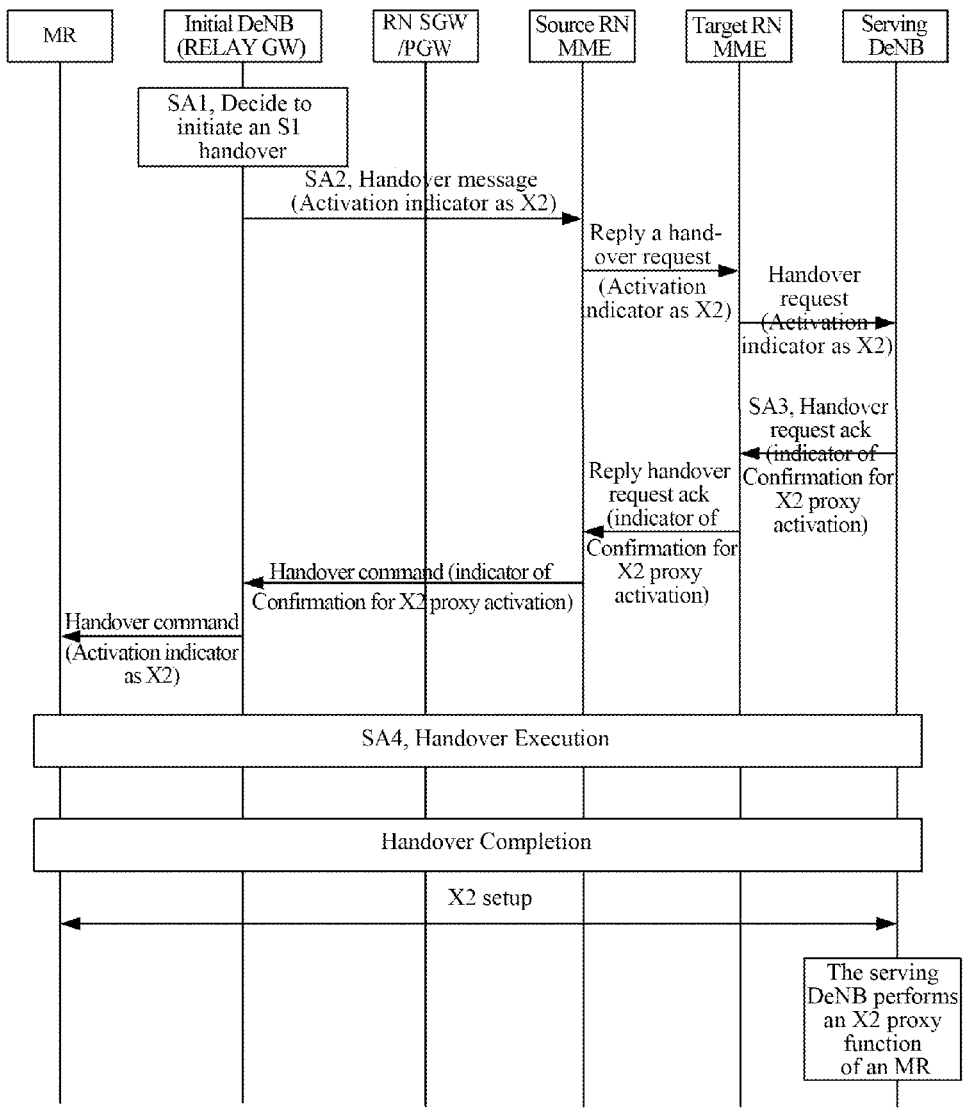
FIG. 8 is a flowchart of a fourth case of the method for enhancing the X2 interface proxy in the embodiments of the present application.

As shown in FIG. 8, in the embodiments of the present application, during the process of an S1 handover process activating an X2 proxy, an indicator of X2 proxy activation can be carried in an handover process of an MR from initial DeNB through a Source RN MME, a target (Target) RN MME to the serving DeNB. FIG. 8 is the operations in an S1 handover process.

An indicator of X2 proxy activation is carried in a Handover ReQuired message sent by the initial DeNB to the Source RN MME. Correspondingly, the Handover request message subsequently sent from the Source RN MME and Target RN MME to the serving DeNB also comprises the indicator of X2 proxy activation.

Preferably, after receiving the message carrying the indicator of X2 proxy activation, the serving DeNB can carry an indicator of Confirmation for X2 proxy Activation in the handover request ack message sent to the Target RN MME. Correspondingly, the handover confirmation message subsequently sent from the Target RN MME and the Source RN MME to the serving DeNB also comprises the indicator of X2 proxy Activation or the indicator of rejection for X2 proxy Activation.

Or the serving DeNB directly initiates an X2 setup process with the MR. Preferably, the indicator of X2 proxy activation is carried in the related message sent to the MR.

Or, during the handover process, the MR carries the indicator of X2 proxy activation in the message sent to the serving DeNB.

The process of setting up the X2 connection between the MR and the serving DeNB is described as below.

In step SA1, the initial DeNB decides to initiate an S1 handover for the MR to the DeNB.

In step SA2, the initial DeNB sends a handover request message to the serving DeNB. Preferably, the message can carry an activation indicator as X2 proxy. Preferably, a Source RN MME sends the handover request message to a Target RN MME, and the message can carry an activation indicator as X2 proxy. Preferably, the Target RN MME sends the handover request message to the Serving DeNB, and the message can carry the activation indicator as X2 proxy. The above activation indicator is an indicator for activating the X2 proxy function of the MR.

In step SA3, after receiving the handover request message, the Serving DeNB replies a Handover Request Ack message to the Target RN MME, to confirm to accept the handover. Preferably, the message can carry an indicator of Confirmation for X2 proxy Activation or an indicator of rejection for X2 proxy Activation.

Or after receiving the X2 handover request message, the Serving DeNB replies the handover failure message to the Target RN MME, to confirm to reject the handover. Preferably, the message can carry the indicator of rejection for X2 proxy Activation.

Correspondingly, the Target RN MME replies a forward handover response message or a handover failure message to the Source RN MME. The message can carry the indicator of confirmation or the indicator of rejection for X2 proxy activation. The Source RN MME sends a handover command or the handover failure message to the initial DeNB, and the message can carry the indicator of confirmation or the indicator of rejection for X2 proxy activation.

In step SA4, it is to perform the subsequent handover process (Handover Execution and Handover Complete). If the Serving DeNB confirms the handover and does not reject the X2 proxy activation, X2 setup is preformed between the MR and the Serving DeNB. The Serving DeNB performs the X2 proxy function of the MR.

If the indicator for activating the X2 proxy is not in the above handover request message, it can be carried in the RRC connection reconfiguration complete message sent from the MR to the Serving DeNB in the subsequent handover process.

Embodiment 5

Figure 9:
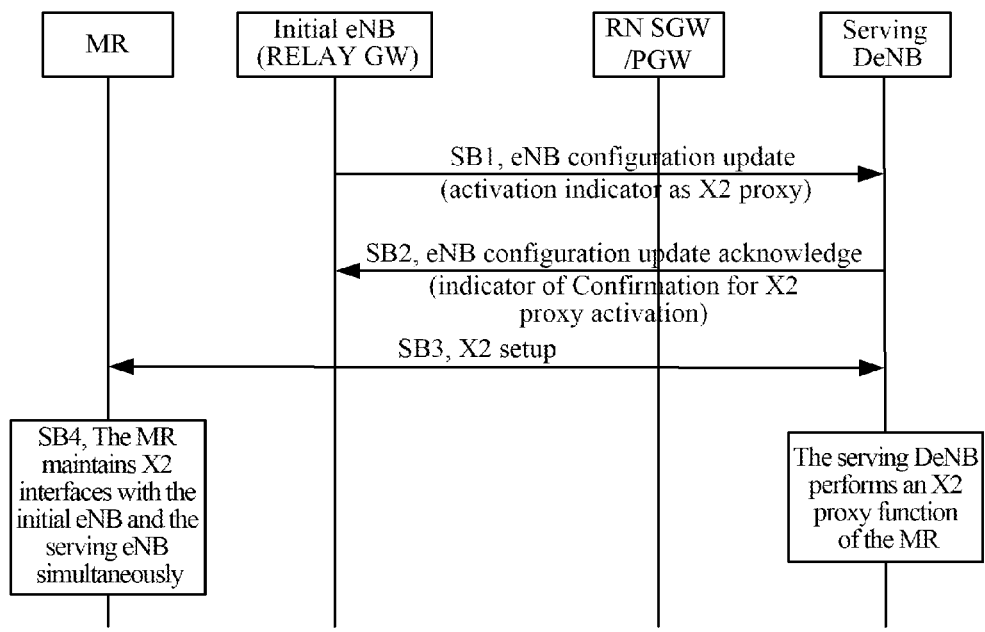
FIG. 9 is a flowchart of a fifth case of the method for enhancing the X2 interface proxy in the embodiments of the present application.

As shown in FIG. 9, in the embodiments of the present application, the process of a base station configuration update process activates the X2 proxy (initiated by initial DeNB), comprising following steps:

In step SB1, an initial DeNB sends an eNB configuration update message to a serving DeNB. The message can carry an indicator for activating an X2 proxy. The above activation indicator is an indicator for activating the X2 proxy function of the MR.

In step SB2, after receiving the eNB configuration update message, the serving DeNB replies an eNB configuration update acknowledge message to the initial DeNB. The message can carry an indicator of confirmation for X2 proxy activation or an indicator of rejection for X2 proxy activation.

Or after receiving the eNB configuration update message, the serving DeNB replies an eNB configuration update failure message to the initial DeNB. The message can carry the indicator of confirmation for X2 proxy activation or the indicator of rejection for X2 proxy activation.

In step SB3, X2 setup is performed between the Serving DeNB and the MR. If the Serving DeNB does not reject the X2 proxy activation, the Serving DeNB performs the X2 proxy function of the MR.

In step SB4, if the X2 interface between the MR and the serving eNB is set up successfully, the MR maintains an X2 interface between the MR and the Initial eNB and an X2 interface between the MR and the serving eNB simultaneously, for example, the X2 messages is sent to two eNBs simultaneously or only sent to one eNB according to the judgment with respect to the related information.

Embodiment 6

Figure 10:
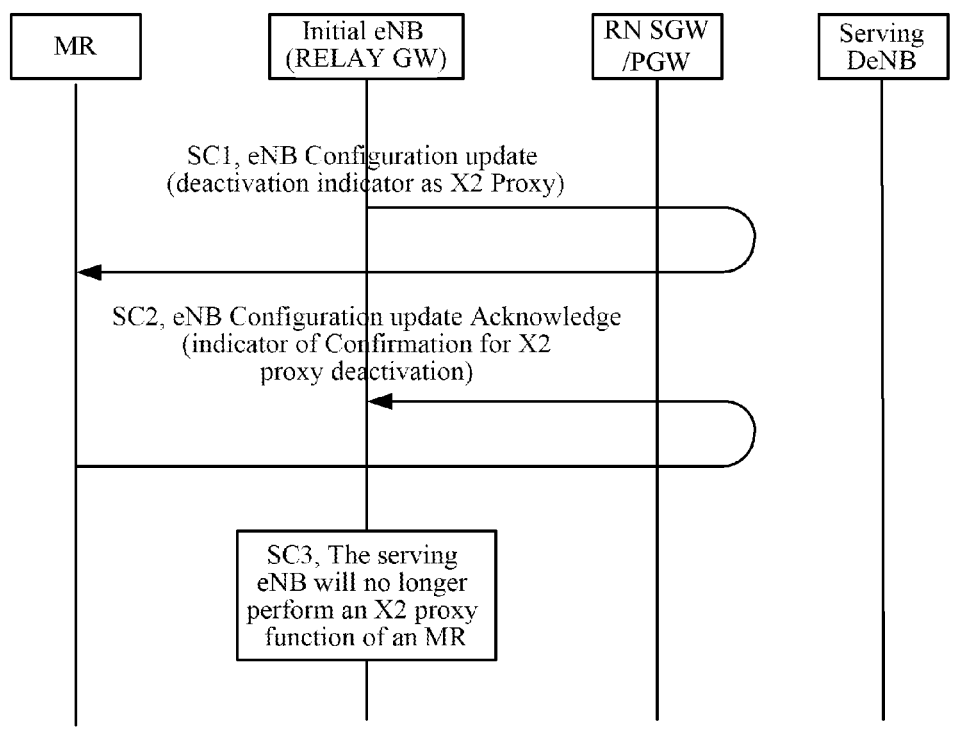
FIG. 10 is a flowchart of a sixth case of the method for enhancing the X2 interface proxy in the embodiments of the present application.

As shown in FIG. 10, in the embodiments of the present application, the process of the base station configuration update process deactivating the X2 proxy (initiated by initial DeNB) comprises the following contents:

In step SC1, the initial DeNB sends an eNB Configuration Update message to the serving DeNB. Preferably, the message can carry a deactivation indicator as X2 proxy. The above deactivation indicator is an indicator for deactivating the X2 proxy function of the MR.

In step SC2, after receiving the eNB configuration update message, the MR replies an eNB configuration update acknowledge message to the initial DeNB. The message can carry an indicator of confirmation for X2 proxy deactivation or an indicator of rejection for X2 proxy deactivation.

Or after receiving the eNB configuration update message, the MR replies an eNB configuration update failure message to the initial DeNB. The message can carry the indicator of confirmation for X2 proxy deactivation or the indicator of rejection for X2 proxy deactivation.

In step SC3, If the MR does not reject the X2 proxy deactivation, the initial DeNB will not performs the X2 proxy function of the MR.

Similarly, the serving eNB can also initiates the X2 proxy deactivation to the initial DeNB through the eNB configuration update process, which will not be repeated.

The X2 proxy functions between the MR and two DeNBs are maintained simultaneously.

Embodiment 7

Figure 11:
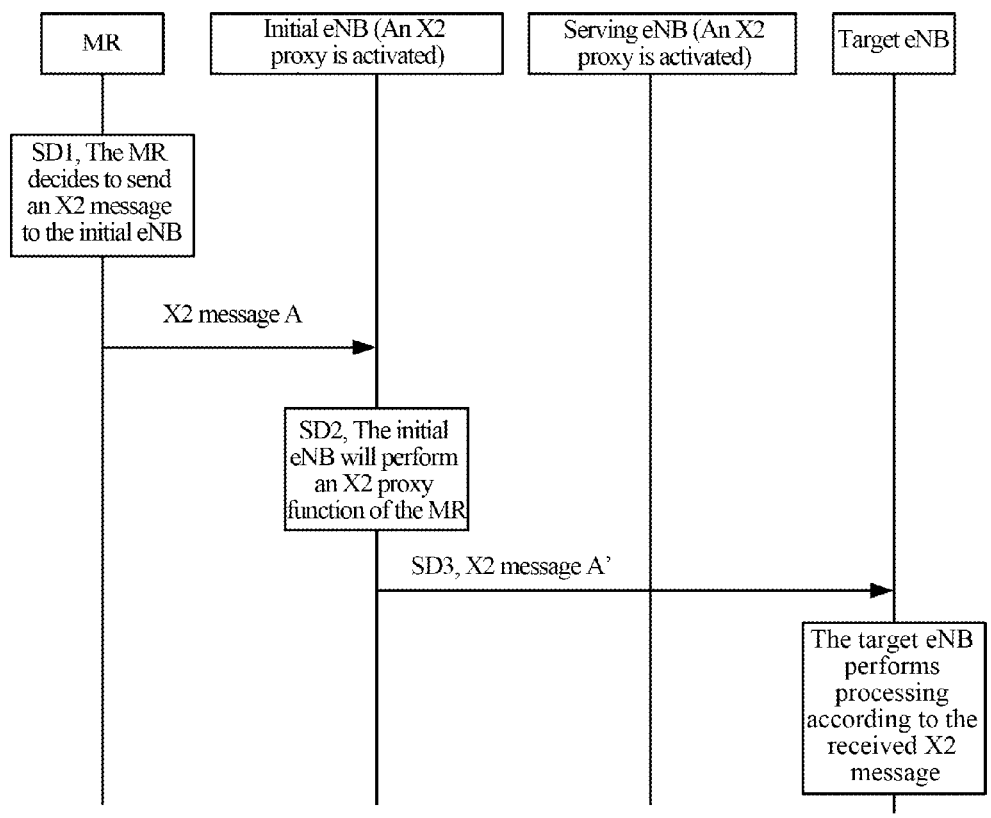
FIG. 11 is a flowchart of a seventh case of the method for enhancing the X2 interface proxy in the embodiments of the present application.

As shown in FIG. 11, X2 message sending controlled by the MR comprises following steps:

In step SD1, An MR determines to send a corresponding X2 message to only one of DeNBs according to known information of a neighboring cell of the DeNB1 and the DeNB2, information of a target cell to which the X2 message is to be sent. The neighboring cell of the DeNB comprises the target cell.

In step SD2, the DeNB which has received the X2 message performs the X2 proxy function, and sends the corresponding X2 message to the target eNB according to the target cell in the message (Step SD3).

As the process shown in FIG. 11, for example, the MR decides to send the X2 message only to the Ini eNB. If the MR decides to send the X2 message only to the Serving eNB, the process is similar and will not be repeated.

Embodiment 8

In the embodiments of the present application, an MR sends an X2 message to be sent to two DeNBs respectively, and the DeNB does not perform enhancement processing.

Figure 12:
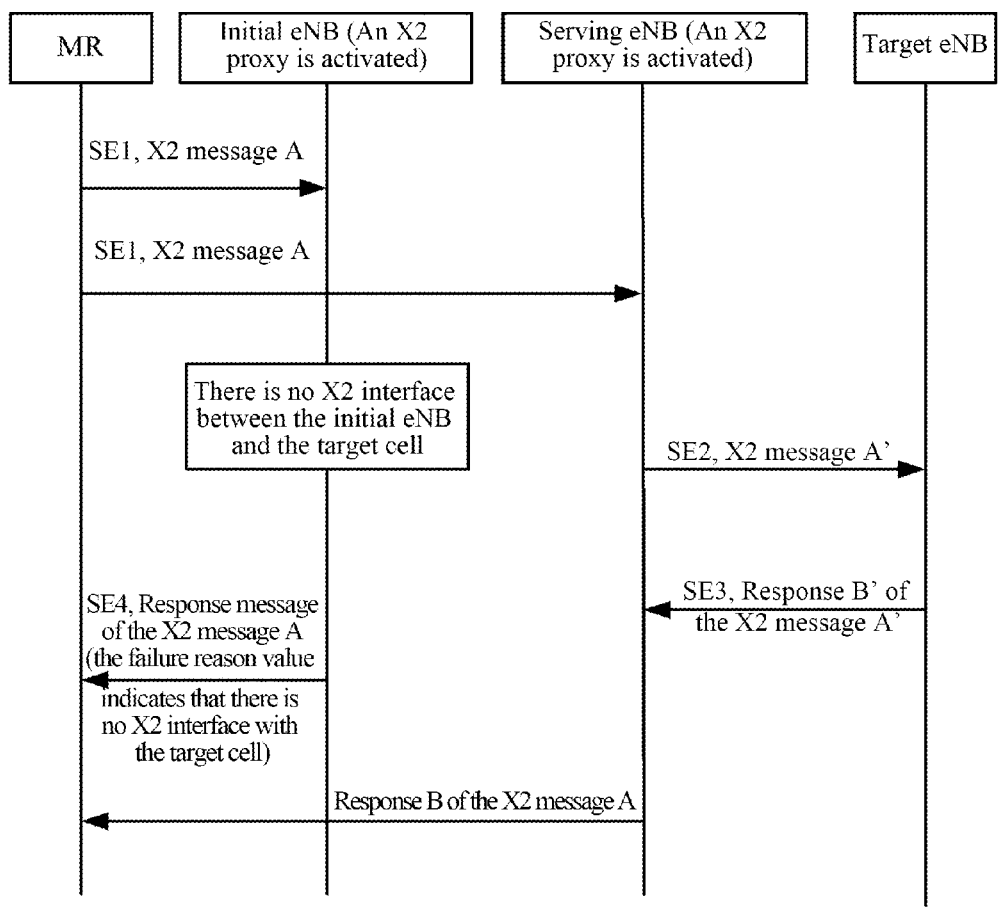
FIG. 12 is a flowchart of a eighth case of the method for enhancing X2 interface proxy, in which an MR sends a message-success response to all the X2 proxies, in embodiments of the present application.

As shown in FIG. 12, the process of the present embodiment comprises following steps:

In step SE1, the MR sends the X2 message to be sent to two DeNBs respectively.

In step SE2, after receiving the X2 message, the DeNB determines to send a corresponding X2 message to the target cell according to the target cell in the message.

If there is no X2 interface between the DeNB and the target cell, the message will not be sent. Preferably, the DeNB can reply a corresponding failure message to the MR. Preferably, reason information is carried to indicate that there is no X2 interface between the DeNB and the target cell.

In step SE3, the target cell has received the X2 message sent from the DeNB, performs corresponding processing and makes a reply.

If the target cell has received the X2 message indicating the same information or operation and coming from a DeNB different from that of the message received firstly, it will reply a failure message to the sender (the DeNB that sends the X2 message) of the X2 message which is received repeatedly (receiving the second X2 message and more X2 messages subsequently). Preferably, the reason information is carried to indicate that the X2 message has been transmitted repeatedly.

In step SE4, after receiving the reply from the target cell, the DeNB replies a corresponding response message to the MR.

Figure 13:
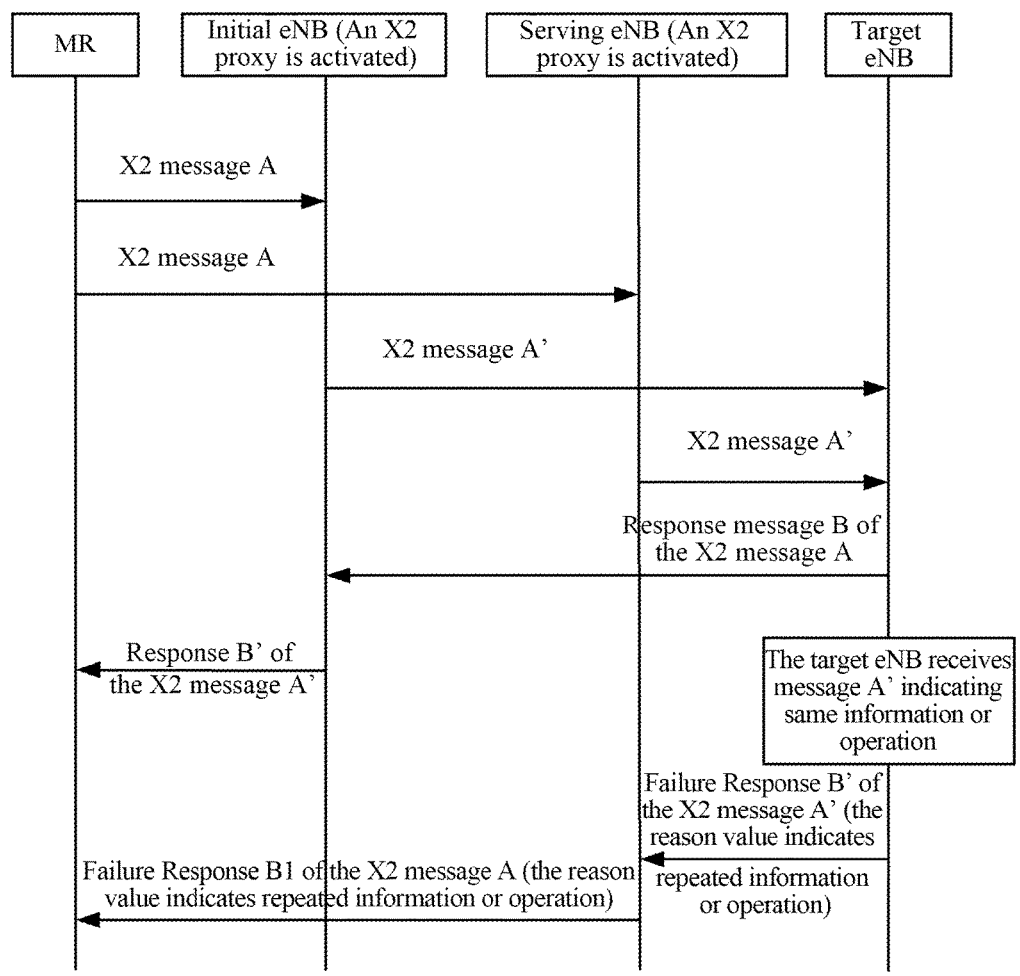
FIG. 13 is a flowchart of the eighth case of the method for enhancing X2 interface proxy, in which the MR sends a message-failure response to all the X2 proxies, in embodiments of the present document.

FIG. 12 is a flowchart of an MR sending a message-success response to all the X2 proxies in the embodiment of the present application. FIG. 13 is a flowchart of an MR sending a message-failure response to all the X2 proxies in the embodiments of the present application. The contents of FIG. 13 will be understood by referring to the above process and the contents of FIG. 12. There is no need to describe repeatedly here.

Embodiment 9

In the embodiments of the present application, the MR sends the X2 message to be sent to two DeNBs respectively, and the DeNB performing enhancement processing.

Figure 14:
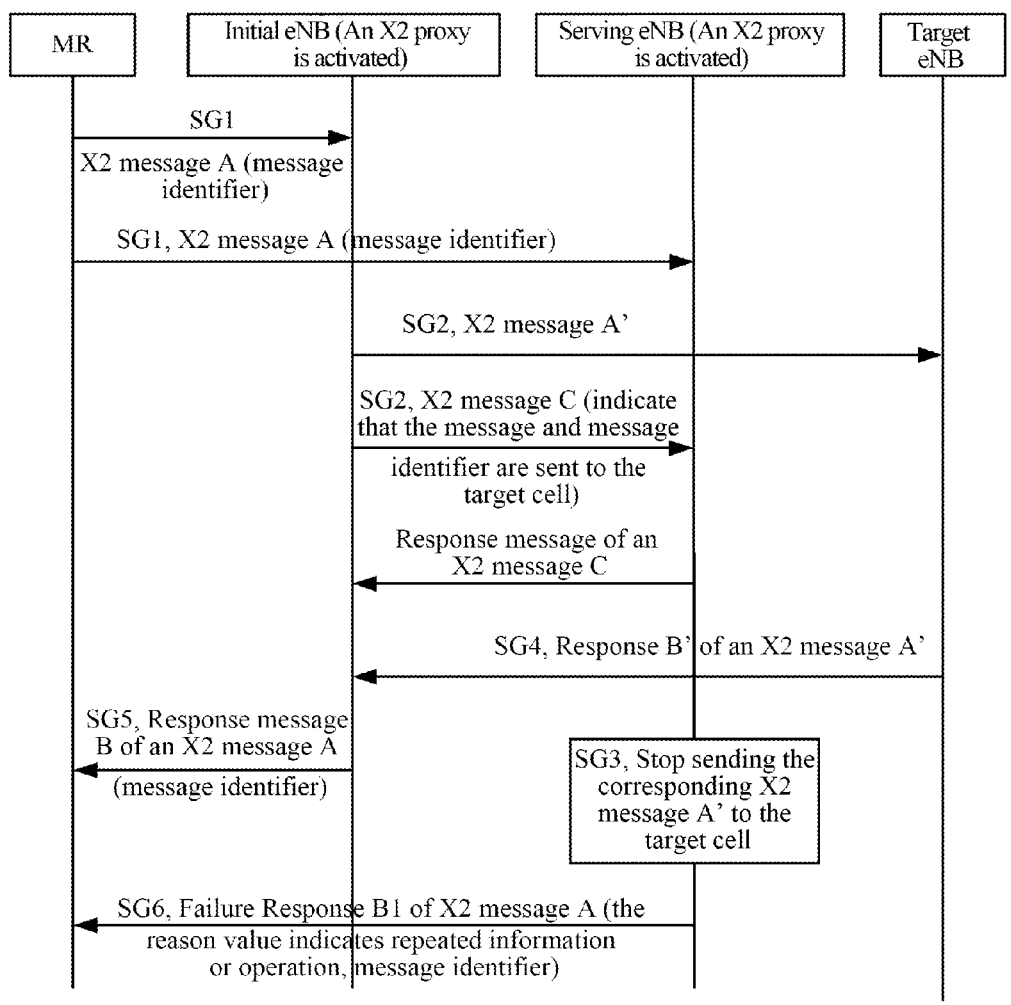
FIG. 14 is a flowchart of a ninth case of the method for enhancing the X2 interface proxy in embodiments of the present application.

As shown in FIG. 14, the process of the present embodiment comprises following contents.

In step SG1, the MR sends the X2 message to be sent to two DeNBs respectively. Preferably, the MR can carry the same identifier in both the messages, which indicates that they are the same information or operation.

In step SG2, after receiving the X2 message, the DeNB1 (shown as initial eNB in the Figure, i.e. Ini eNB) determines that the target cell of the X2 message has the X2 interfaces with both DeNB1 and DeNB2 according to the known information of the neighboring cell of the DeNB2 (shown as Serving eNB in the Fig.) which is also the X2 proxy of the MR. The DeNB1 sends the corresponding X2 message to the target cell, and sends an indicator indicating that the X2 proxy of the message has been performed to the DeNB2. Preferably, the above message identifier can be carried.

In step SG3, after receiving the indicator sent from the DeNB1, the DeNB2 stops sending the corresponding X2 message to the target cell, and replies a failure response to the MR. Preferably, the failure response carries failure reason information, which indicates that it is the repeated information or operation In step SG4, after receiving the above X2 message sent by the DeNB1, the target cell replies a corresponding response message to the DeNB1.

In step SG5, the DeNB1 sends the corresponding response message to the MR according to the response replied by the target cell. Preferably, the message can carries the above same message identifier.

In step SG6, after receiving the above X2 message sent from the MR and the indicator indicating that the X2 proxy of the message has been performed sent from the DeNB1, the DeNB2 replies the failure response to the MR. Preferably, the reason information is carried to indicate that it is the repeated information or operation. Preferably, the above same message identifier is carried.

Embodiment 10

In the embodiments of the present application, the MR sends the X2 message to one of the DeNBs.

Figure 15:
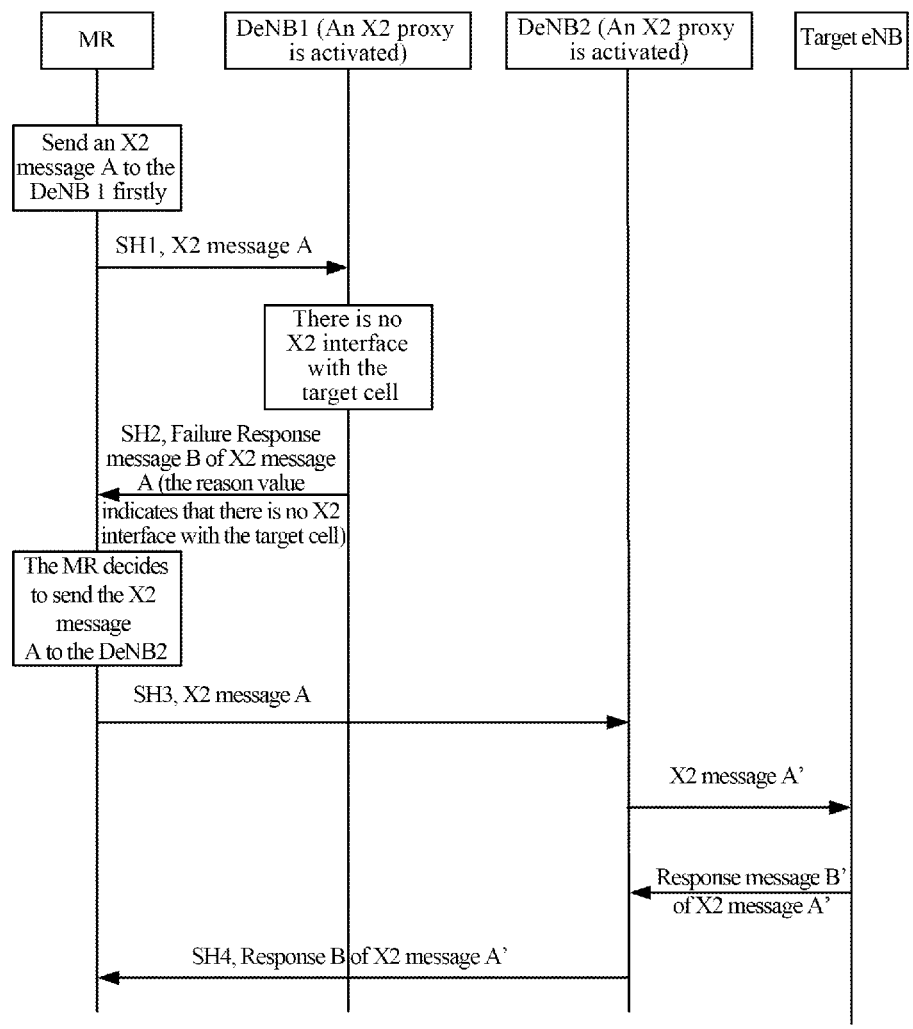
FIG. 15 is a flowchart of a tenth case of the method for enhancing the X2 interface proxy in embodiments of the present application.

As shown in FIG. 15, the process of the present embodiment comprises the following steps.

In step SH1, the MR sends the X2 message to the DeNB1.

After receiving the X2 message, the DeNB1 determines to send the X2 message to the target cell according to the target cell in the information.

If the target cell does not belong to the neighboring cell of the DeNB1, the message will not be sent. Preferably, the DeNB1 can reply a corresponding failure message to the MR (step SH2). Preferably, the reason information is carried to indicate that the target cell is not a neighboring cell.

The target cell has received the X2 message sent from the DeNB1, and performs corresponding processing and makes a reply.

After receiving the reply from the target cell, the DeNB1 replies a corresponding response message to the MR.

If the MR has received the failure response sent from the DeNB1, and the reason information indicates that the target cell is not a neighboring cell, the MR sends the X2 message to the DeNB2 (step SH3). The DeNB2 performs corresponding processing according to the message content, and replies the corresponding response message to the MR (step SH4). If the target cell does not belong to the neighboring cell of the DeNB2 either, the X2 message is continuously sent to other DeNBs to seek a proxy, until the DeNB whose target cell belongs to its neighboring cell sends the X2 message to the target cell successfully.

Figure 16:
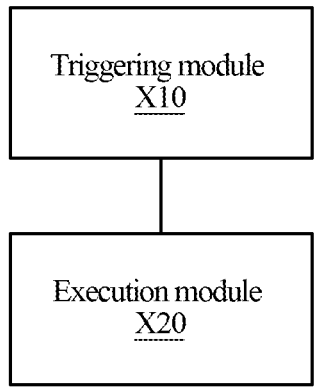
FIG. 16 is a schematic diagram of construction of a mobile relay in embodiments of the present application.

As shown in FIG. 16, the mobile relay (MR) in the embodiments of the present application mainly comprises a triggering module X10 and an execution module X20.

the triggering module X10 is configured to trigger an MR gateway to relocate from an initial DeNB to a serving DeNB, or trigger to set up an X2 interface between the MR and the serving DeNB;

the execution module X20 is connected with the triggering module X10, and is configured to use the serving DeNB as an X2 proxy of the MR and a base station adjacent to the MR.

In the embodiments of the present application, the triggering module X10 is configured to, during or after the handover, trigger the Relay GW to relocate from the initial DeNB to the serving DeNB, or during or after the handover, trigger to set up an X2 interface between the MR and the serving DeNB.

In the embodiments of the present application, the triggering module X10 is configured to trigger and activate during or after the MR handover.

In the embodiments of the present application, the triggering module X10 is configured to, in an X2 setup process between the MR and the serving DeNB, use the serving DeNB as the X2 proxy of the MR and the base station adjacent to the MR by carrying an activation indicator, or when the X2 interface between the MR and the serving DeNB is set up, use the serving DeNB as an X2 proxy of the MR and the base station adjacent to the MR by default.

In the embodiments of the present application, the triggering module X10 is configured to, use the serving DeNB as the X2 proxy between the MR and the base station adjacent to the MR by carrying the activation indicator in the X2 handover process or the S1 handover process of the MR from the initial DeNB to the serving DeNB.

In the embodiments of the present application, the triggering module X10 is configured to carry the activation indicator in an RRC connection reconfiguration complete message sent from the MR to the serving DeNB.

In the embodiments of the present application, the triggering module X10 is configured to carry the activation indicator in a base station configuration update message between the MR and the serving DeNB.

Figure 17:
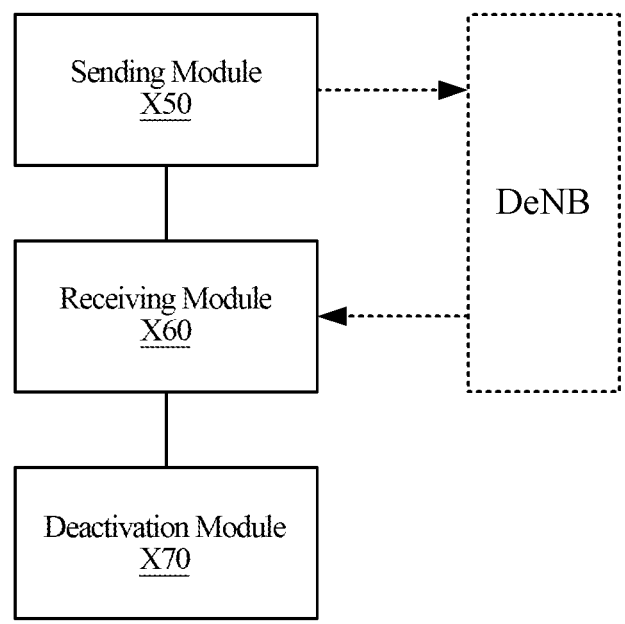
FIG. 17 is a schematic diagram of construction of another mobile relay in embodiments of the present application.

As shown in FIG. 17, the mobile relay in the embodiments of the present application comprises a sending module X50 and a receiving module X60.

The sending module X50 is configured to send an X2 message to at least one DeNB.

The receiving module X60 is configured to receive a response replied by the DeNB which sends the X2 message to the target cell.

As shown in FIG. 17, the embodiments of the present application, the MR also comprises:

a deactivation module X70, connected with the receiving Module X60, configured to, after the X2 proxy function of the serving DeNB has been activated, deactivate the X2 proxy function of one of the DeNBs.

In the embodiments of the present application, the deactivation module X70 is configured to deactivate the X2 proxy function of the DeNB by carrying a deactivate indicator in the X2 proxy releasing process or the X2 interface releasing process between the MR and the DeNB; or when the X2 proxy between the MR and the X2 proxy node is released, deactivate the X2 proxy function by default.

In the embodiments of the present application, a maintenance module is configured to send the X2 message to one DeNB of eNBs for a plurality of X2 proxies or send the X2 message to be sent to a plurality of DeNBs respectively.

In the embodiments of the present application, the receiving module X60 is configured to receive the proxy failure response replied by the DeNB which has received the X2 message and has no X2 interface with the target cell.

In the embodiments of the present application, the receiving module X60 is configured to receive the proxy failure response replied by the DeNB. Wherein, the sending module X50 is configured to send the X2 message to a plurality of DeNBs; the plurality of DeNBs send the same X2 message to the target cell, and after the target cell receives the first X2 message, it replies the proxy failure response to a sender of the X2 message which has been received repeatedly;

Or, the sending module X50 is configured to send the X2 message to a plurality of DeNBs; One of the DeNBs which receive the X2 message sends the X2 message to the target cell, and sends the indication information that the X2 proxy has been performed to other DeNBs which have received the X2 message and have the X2 interface with the target cell. The DeNB which has received the indication information that the X2 proxy has been performed replies the proxy failure response to the MR.

In the embodiments of the present application, the sending module X50 is configured to send the X2 message to one of the DeNBs. When the receiving module X60 receives the proxy failure response that the target cell is not a neighboring cell of the DeNB which receives the X2 message, it sends the X2 message to another DeNB; the receiving module X60 is configured to receive the proxy failure response.

Those skilled in the art should understand that the above devices and methods provided by the embodiments of the present application can be integrated into a single computing device or distributed across a network composed of a plurality of computing devices. Optionally, they can be implemented by program codes executable by the computing devices. Thus, the program codes executable by the computing devices can be stored in the storage device and implemented by the computing devices, or they can be made into various integrated circuit modules respectively, or many modules or steps therein can be made into a single integrated circuit to implement. Thus, the present document is not limited to any specific combination of hardware and software.

The embodiments disclosed in the present document are described above, but they are only the preferred embodiments of the present document for understanding the present document easily, and they are not used for limiting the protection scope of the present document. Those skilled in the art can make any modification and change in the implementations and details without departing from the spirit and scope of the present document, but the protection scope of the present document is subject to the scope defined by the appended claims.

INDUSTRIAL APPLICABILITY

The embodiments of the present document overcome the defects that under some current situations, the X2 proxy may not work between the MR or the HeNB and its neighboring base station, thus enhancing the interface proxy function among the nodes.

What is claimed is:

1. A method for enhancing an (X2) interface proxy between two nodes, comprising:
    triggering an X2 proxy to relocate from a first node to a second node; and
    using the second node as an X2 proxy of a third node and a base station adjacent to the third node;
    wherein
    triggering an X2 proxy to relocate from a first node to a second node, comprises: during or after handover, triggering the X2 proxy to relocate from the first node to the second node; the method further comprising
    a plurality of X2 proxy nodes sending an X2 message indicating same information or a same operation to a target cell, and after receiving a first X2 message, the target cell replying a proxy failure response to a sender of the X2 message which has been received repeatedly, and the X2 proxy nodes, which have received the proxy failure response, replying the proxy failure response to the third node; or
    one of the X2 proxy nodes which have received an X2 message, sending the X2 message to a target cell, and sending indication information that the X2 proxy has been performed to other X2 proxy nodes which have received the X2 message and have an X2 interface with the target cell; the X2 proxy nodes, which have received the indication information that the X2 proxy has been preformed, sending a proxy failure response to the third node.

2. The method of claim 1, wherein
    the base station adjacent to the third node comprises an evolved Node B, a Relay Node, a mobile relay, a Pico or Home evolved Node B (HeNB).

3. The method of claim 1, wherein, using the second node as an X2 proxy of the third node and a base station adjacent to the third node, comprises:

during a process that the X2 proxy relocates from the first node to the second node, triggering and activating the second node as the X2 proxy of the third node and the base station adjacent to the third node; or during or after the handover of the third node, the first node, the second node or the third node triggering and activating the second node as the X2 proxy of the third node and the base station adjacent to the third node.

4. The method of claim 1, wherein, using the second node as an X2 proxy of the third node and a base station adjacent to the third node, comprises:
    carrying an activation indicator in an X2 setup process between the third node or the first node and the second node to use the second node as the X2 proxy of the third node and the base station adjacent to the third node;
    carrying the activation indicator in the X2 handover process or an S1 handover process of the third node from the first node to the second node to use the second node as the X2 proxy of the third node and the base station adjacent to the third node;
    carrying the activation indicator in a base station configuration update message between the third node or the first node and the second node; or
    after the X2 interface between the third node and the second node is set up, triggering the second node by default as the X2 proxy of the third node and the base station adjacent to the third node,
    or,
    wherein, carrying the activation indicator in the X2 handover process or an S1 handover process of the third node from the first node to the second node, comprises:
    carrying the activation indicator in a handover request message sent from the first node to the second node, or carry the activation indicator in an radio resource control (RRC) connection reconfiguration complete message sent from the third node to the second node.

5. A method for processing an X2 proxy between two nodes, comprising:
    a third node sending an X2 message to at least one X2 proxy node;
    an X2 proxy node, which has received the X2 message and has an X2 interface with a target cell, sending the X2 message to the target cell; and
    the third node receiving a response replied by the X2 proxy node which sends the X2 message to the target cell; the method further comprising
    a plurality of X2 proxy nodes sending the X2 message indicating same information or a same operation to the target cell, and after receiving a first X2 message, the target cell replying a proxy failure response to a sender of the X2 message which has been received repeatedly, and the X2 proxy nodes, which have received the proxy failure response, replying the proxy failure response to the third node; or
    one of the X2 proxy nodes which have received the X2 message, sending the X2 message to the target cell, and sending indication information that the X2 proxy has been performed to other X2 proxy nodes which have received the X2 message and have an X2 interface with the target cell; the X2 proxy nodes, which have received the indication information that the X2 proxy has been preformed, sending a proxy failure response to the third node,
    or wherein, the proxy failure response carries reason information for proxy failure;

or wherein,
the reason information for proxy failure comprises that the same information or operation is sent repeatedly, load exceeds a preset threshold, network failure, there is no X2 interface with the target cell, or the target cell is not the neighboring cell.

6. The method of claim 5, wherein, a third node sending an X2 message to at least one X2 proxy node, comprises:
the third node carrying a same identifier in the various X2 messages sent to at least one X2 proxy node to indicate same information or operation.

7. The method of claim 5, further comprising:
according to known information of neighboring cells of a first X2 proxy node and a second X2 proxy node, and information of the target cell to which the X2 message is to be sent, the third node determining to send the X2 message to one of the X2 proxy nodes.

8. The method of claim 7, wherein, determining to send the X2 message to one of the X2 proxy nodes, comprises:
the third node determining to send the X2 message to the X2 proxy node whose neighboring cells include the target cell.

9. The method of claim 5, further comprising:
deactivating the X2 proxy function of the X2 proxy node.

10. The method of claim 9, wherein, deactivating the X2 proxy function of the X2 proxy node, comprises:
carrying a deactivation indicator in an X2 proxy releasing process or an X2 interface releasing process between the third node and the X2 proxy node, to deactivate the X2 proxy function of the X2 proxy node; or
when the X2 interface between the third node and the X2 proxy node is released, deactivating the X2 proxy function of the X2 proxy node by default.

11. The method of claim 5, further comprising:
the third node receiving a proxy failure response replied by the X2 proxy node which has received the X2 message but cannot perform the X2 proxy,
or, wherein, the proxy failure response carries reason information for proxy failure;
or, wherein,
the reason information for proxy failure comprises that the same information or operation is sent repeatedly, load exceeds a preset threshold, network failure, there is no X2 interface with the target cell, or the target cell is not the neighboring cell.

12. The method of claim 5, wherein the method comprises:
after receiving the X2 message, according to the previously known information of the neighboring cell of the second X2 proxy node, the first X2 proxy node determining that the target cell of the X2 message is a neighboring cell of both the first X2 proxy node and the second X2 proxy node;
the first X2 proxy node sending a corresponding X2 message to the target cell, and indicating to the second X2 proxy node that the X2 proxy of the X2 message has been performed; and
after receiving the X2 message sent from the third node and the indicator that the first X2 proxy node has performed the X2 proxy of the X2 message, the second X2 proxy node replying the proxy failure response to the third node,
or, wherein, the proxy failure response carries reason information for proxy failure;
or, wherein,
the reason information for proxy failure comprises that the same information or operation is sent repeatedly, load exceeds a preset threshold, network failure, there is no X2 interface with the target cell, or the target cell is not the neighboring cell.

13. The method of claim 5, wherein, a third node sending an X2 message to at least one X2 proxy node, comprises:
the third node sending the X2 message to one of the X2 proxy nodes, when the proxy failure response has been received, sending the X2 message to another X2 proxy node until the target cell is the neighboring cell of the X2 proxy node that receives the X2 message, and sending the X2 message to the target cell,
or, wherein, the proxy failure response carries reason information for proxy failure;
or, wherein,
the reason information for proxy failure comprises that the same information or operation is sent repeatedly, load exceeds a preset threshold, network failure, there is no X2 interface with the target cell, or the target cell is not the neighboring cell.

14. A mobile relay (MR), comprising:
a triggering circuit, configured to trigger an X2 proxy between two nodes to relocate from a first node to a second node; and
an execution circuit, configured to use the second node as an X2 proxy of the MR and a base station adjacent to the MR;
wherein
the trigger circuit is configured to trigger the X2 proxy to relocate from the first node to the second node during or after handover;
the mobile relay further comprising a sending circuit, configured to send an X2 message to at least one X2 proxy node between two nodes; wherein the sending circuit is configured to send the X2 message to a plurality of X2 proxy nodes; the plurality of X2 proxy nodes send the same X2 message to a target cell, and the target cell sends a proxy failure response to a sender of the X2 message which has been received repeatedly after receiving a first X2 message; or
the sending circuit is configured to send the X2 message to the plurality of X2 proxy nodes; one of the X2 proxy nodes which has received the X2 message sends the X2 message to a target cell, and sends indication information that the X2 proxy has been performed to other X2 proxy nodes that have received the X2 message and have an X2 interface with the target cell; the X2 proxy nodes, which have received the indication information that the X2 proxy has been performed, reply a proxy failure response to the MR.

15. The MR of claim 14, wherein,
the triggering circuit is configured to trigger and activate during or after the MR handover,
or,
wherein, the triggering circuit is configured to carry an activation indicator in an X2 setup process between the MR and the second node to use the second node as an X2 proxy between the MR and the base station adjacent to the MR; and carry the activation indicator in an X2 handover process or an S1 handover process of the MR from the first node to the second node to use the second node as an X2 proxy between the MR and the base station adjacent to the MR, carry the activate indicator in a base station configuration update message; or after the X2 interface between the MR and the second node is set up, activate the second node as the X2 proxy of the MR and the base station adjacent to the MR by default, or, wherein, the triggering circuit is configured to carry the activate indicator in a radio resource control (RRC) reconfiguration connection complete message sent from the MR to the second node.

16. A mobile relay (MR), comprising:

a sending circuit, configured to send an X2 message to at least one X2 proxy node between two nodes; and a receiving circuit, configured to receive a proxy failure response replied by an X2 proxy node which sends the X2 message to a target cell;

wherein, the receiving circuit is configured to receive the proxy failure response replied by the X2 proxy node, wherein the sending circuit is configured to send the X2 message to a plurality of X2 proxy nodes; the plurality of X2 proxy nodes send the same X2 message to the target cell, and the target cell sends the proxy failure response to a sender of the X2 message which has been received repeatedly after receiving a first X2 message; or the sending circuit is configured to send the X2 message to the plurality of X2 proxy nodes; one of the X2 proxy nodes which has received the X2 message sends the X2 message to the target cell, and sends indication information that the X2 proxy has been performed to other X2 proxy nodes that have received the X2 message and have an X2 interface with the target cell; the X2 proxy nodes, which have received the indication information that the X2 proxy has been performed, reply the proxy failure response to the MR.

17. The MR of claim 16, further comprising:

a deactivation circuit, configured to deactivate an X2 proxy function of an X2 proxy node, or, wherein, the deactivate circuit is configured to carry a deactivation indicator in an X2 proxy releasing process or an X2 interface releasing process between the MR and the X2 proxy node, to deactivate the X2 proxy function of the X2 proxy node; or when the X2 interface between the MR and the X2 proxy node is released, deactivate the X2 proxy function of the X2 proxy node by default.

18. The MR of claim 16, wherein, the receiving circuit is configured to receive a proxy failure response replied by the X2 proxy node which has received the X2 message and has no X2 interface with the target cell, or, wherein, the sending circuit is configured to send the X2 message to an X2 proxy node; when the receiving module receives a proxy failure response that the target cell is not a neighboring cell of the X2 proxy node that has received the X2 message, send the X2 message to another X2 proxy node; and the receiving circuit is configured to receive the proxy failure response.

* * * * *